United States Patent [19]

Grycel, III

[11] 3,838,802

[45] Oct. 1, 1974

[54] REMOVABLE LUGGAGE RACK FASTENING MEANS

[76] Inventor: Felix John Grycel, III, 5941 Etiwanda St., Tarzana, Calif. 91356

[22] Filed: Mar. 5, 1973

[21] Appl. No.: 337,899

[52] U.S. Cl............ 224/42.1 E, 24/221 K, 211/86, 224/29 R
[51] Int. Cl............................................. B60r 9/04
[58] Field of Search....... 211/86, 60 SR; 248/119 R, 248/361 R; 24/211 P, 221 K, 221 X, 221 L; 403/353; 224/42.1 R, 42.1 D, 42.1 E, 42.16, 42.1 F, 29 R

[56] References Cited
UNITED STATES PATENTS

| 1,454,251 | 5/1923 | Powell | 24/221 K |
|---|---|---|---|
| 1,647,775 | 11/1927 | Carr | 24/211 R |
| 1,652,575 | 12/1927 | McGinley | 24/221 K |
| 1,733,650 | 10/1929 | Cummings | 24/221 K |
| 2,429,190 | 10/1947 | McArthur | 24/211 P X |
| 2,585,241 | 2/1952 | Gunther | 24/221 L |
| 2,645,391 | 7/1953 | Lecanu-Deschamps | 224/42.1 E |
| 2,664,611 | 1/1954 | Shomber | 24/211 K |

FOREIGN PATENTS OR APPLICATIONS

| 104,715 | 6/1942 | Sweden | 224/42.1 E |

Primary Examiner—Roy D. Frazier
Assistant Examiner—Thomas J. Holko
Attorney, Agent, or Firm—Robert G. Upton

[57] ABSTRACT

A luggage rack or the like is comprised essentially of a pair of removable cross-bars having base portions at their ends, the base portions being insertable within flush-mounted anchors integral with an automobile roof or trunk lid, or the like. The anchors have spring-loaded cover plates that are flush with the receptacle when the cross bars are removed from the anchor mounts during periods of disuse.

1 Claim, 5 Drawing Figures

PATENTED OCT 1 1974 3,838,802

REMOVABLE LUGGAGE RACK FASTENING MEANS

BACKGROUND OF THE INVENTION

1. Field of the Invention

This invention relates to a luggage rack removing mechanism, thus enabling the racks to be removed from their respective mounts, the mounts being an integral part of the vehicle during periods of disuse. The rack-retaining mechanism may be additionally utilized to retain removable aircraft chairs, and the like.

2. Description of the Prior Art

The prior art discloses several fastener means to fasten tonneau covers, panels, and the like, to their respective receptacles or mounts.

One patent in particular (U.S. Pat. No. 1,454,251) discloses a fastener means wherein thumb screws are pushed against a spring in a receptacle, the screw being turned ninety degrees to engage a pair of levers adjacent the bottom end of the screw with detents within the receptacle. The turn screw is removed from its receptacle by reversing the direction of the thumb screw to align the engaging levers with a slot in the receptacle. A Cover plate pushes up against the levers of the thumb screw to prevent the thumb screw from becoming disengaged with detents within the receptacle.

Another patent (U.S. Pat. No. 1,652,575) utilizes a similar principle wherein a protruding knob is pushed into an oblong receptacle, rotated 90° to engage a pair of extending arms or levers within detents in the receptacle. This device also has a cover plate that is spring-loaded within the receptacle to keep the protruding levers engaged during use.

Still another patent (U.S. Pat. No. 3,504,875) discloses a clip-in fastener receptacle. The engaging mechanism for the receptacle includes a shaft with a pair of protruding arms at one end of the shaft which, when aligned with slots in a receptacle, allow the shaft to be pushed through the slots. Rotation of the shaft 90° engages the lever arms within detents in the receptacle. The shaft has a spring mechanism attached thereto to force the lever arms to be engaged within the detent within the receptacle, thus firmly holding the shaft within the receptacle.

All of the foregoing prior art devices are disadvantaged in that they disclose individual means to fasten a panel or tonneau cover, or the like, to a single receptacle. Each of the fastening devices is individually engaged with a single receptacle to affix that particular anchor to the receptacle. Each of the fastening means requires that the engaging mechanism be rotated at least 90° to engage itself within the receptacle. It can be seen that if one were to engage a unitary luggage rack with a cross-bar having, at least, two anchor posts aligned with two or more receptacles, it would be impossible to engage the anchor posts of the luggage racks within their respective receptacles in the manner taught by the prior art. Since the unitary rack has a pair of ends engaged with receptacles, it can be seen that it is impossible to rotate either end 90° to engage the base of the cross bar with their receptacles. None of the prior art patents discloses a means to engage two or more interconnected cross-bars with their respective receptacles.

SUMMARY OF THE INVENTION

This invention describes a means to engage a luggage rack or the like to an automobile roof or trunk lid, or the like, in such a manner that the luggage rack can be easily removed from the roof or trunk lid during periods of disuse. The luggage rack mounting means includes means to provide a flush closeout within the luggage rack mounting means so that when the luggage rack is removed from the mount, a plate integral with the luggage rack mounting means fills the luggage rack receptacle so that a flush, neat appearing luggage rack mount remains, thereby enhancing the appearance of the vehicle while serving the functional purpose of providing a smooth surface for the air flowing over the automobile body, or the like. The invention could also be used to engage the legs of, for example, aircraft chairs that may be removed to haul cargo and the like. Many other applications can be visualized such as anchoring life boats to the deck of ocean liners, etc.

The cross bar type of luggage rack members have at least a pair of downwardly extending base portions that are inserted within the flush-mounted luggage rack mounting means. Each end of the luggage rack has a cleat mechanism that is swivably mounted in the ends of the cross-bar or arms of the luggage rack. The swivably mounted cleat has a pair of protruding lever arms extending out of the base of the cleat so that, when the luggage rack is inserted within the mount, the protruding levers align themselves with opening slots within the luggage rack mount. When the ends of the cross-bars are inserted within the mounts, the swivable cleat associated with each anchor post is pushed into the mount against a spring-loaded cover plate, rotated 90° to engage the protruding levers within detents within the mount, thereby locking the anchor posts of the cross-bar within their mounts. Additionally, a spring is positioned between the base of the cross-bar anchor post and the swivably mounted cleat surrounding the post to assure that the base of the luggage rack anchor post and the base of the swivably mounted cleat are pushed away one from the other, to ensure that the protruding levers or engaging pins on the swivable mount remain engaged within detents integral with the flush-mounted luggage rack frame or bracket during use. Thus, it can be seen that no matter what kind of pressure is exerted against the luggage rack cross member, the swivably mounted cleat cannot become disengaged with the detents within the luggage rack mounting bracket. The luggage rack cross-bars span the gap between a pair of luggage rack mounts within a roof or trunk lid, for example, of an automobile. To attach the luggage rack to the automobile, the anchor posts of the rack are merely aligned with the luggage rack mounts, pushed into the mounts, the cleats rotated 90° to engage the pins of the cleat, the spring-loaded cover plates resisting the pressure of the luggage rack anchor posts. The force of the spring behind the flush cover plate forces the end of the anchor posts of the luggage rack mount upwardly, while at the same time the spring between the end of the anchor post and the base of the swivably mounted cleat assures that the cleat remains engaged with the detents in the mount brakcet. Pressure or weight applied to the luggage rack itself cannot then disengage the rack from the mount. Luggage racks are positioned on an automobile, as just described, only when the owner of the vehicles wishes to utilize a luggage rack. When the owner is through with the luggage rack, it can be easily removed from the mounts, thus cleaning up the appearance of the vehicle which is now free of a wind-resisting protrusion.

Therefore, it is an object of this invention to provide a means to remove a luggage rack from the roof or trunk lid of an automobile or the like.

More specifically, it is an object of this invention to provide a luggage rack mounting means whereby the rack is securely mounted within mounting brackets during use while providing a flush mount when the luggage rack is removed from the brackets, thereby providing an aerodynamically clean surface for the vehicle as it moves through its environment.

An advantage then over the prior art is the ability to anchor two or more integrally connected cross bar members within at least a pair of anchor mounts while providing a method of closing out the anchor mounts flush with the surface of the mounts when the integral cross-bar member is removed from the pair of mounts.

Still another advantage over the prior art is the ability to securely retain the ends or anchor posts of a cross-bar member within at least a pair of mounting brackets even though a load is placed on the cross-bar member.

BRIEF DESCRIPTION OF THE DRAWING

The above noted objects and advantages of the present invention will be more fully understood upon studying the following description in conjunction with the detailed drawings in which.

DESCRIPTION OF THE PREFERRED EMBODIMENTS

Figure 1:
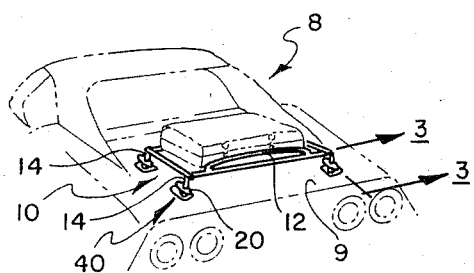
FIG. 1 is a partially cutaway perspective view of a luggage rack mounted on the trunk lid of a vehicle.

Turning now to FIG. 1, the removable member or luggage rack, generally designated as 10, is mounted, for example, to a trunk lid 9 of automobile 8. The luggage rack cross members 12 are attached to the trunk lid 9 by at least four rack anchor legs or posts 14 which are retained within luggage rack anchor frame members 40 attached to the trunk lid. The luggage rack may easily be removed from the trunk lid or the like by depressing swivel cleat 20, rotating the cleat ninety degrees to align pins at the base of the cleat with the verticle slots in the rack retaining frame and sliding the anchor posts 14 from their respective retainers.

Figure 2:
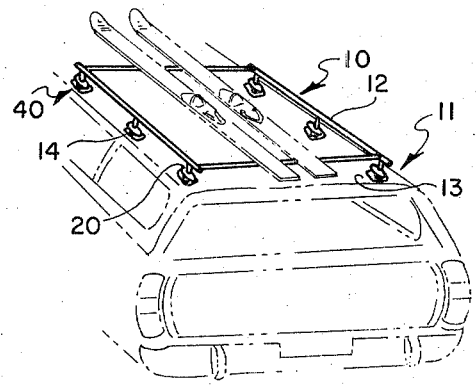
FIG. 2 is another view of the removable luggage rack attached to the roof of a station wagon.

A similar luggage rack 10 may be mounted to the roof 13 of a station wagon 11, as shown in FIG. 2. In this illustration, six or more luggage rack retainers 40 may be mounted within roof 13 to accept a like number of anchor posts 14 within the rack retainers.

When the rack 10 is removed from the rack retainer 40, a spring-loaded cover plate 52 fills the void left by the anchor post, thereby providing a surface flush with the trunk lid, roof, or the like, eliminating the unattractive and wind-resisting rack from the vehicle when it is not in use, as heretofore stated.

Figure 3:
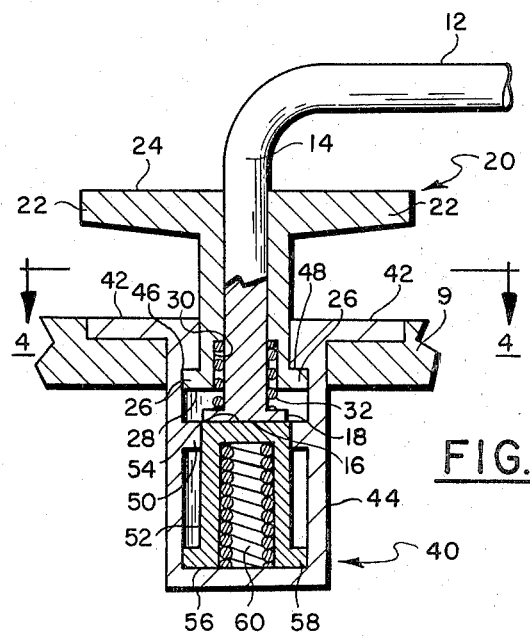
FIG. 3 is a cross-sectional view taken along lines 3—3 of FIG. 1, illustarting the luggage rack retaining mechanism with one leg of the luggage rack being engaged with the luggage retaining frame.

FIG. 3 depicts the rack retaining mechanism 40 mounted flush within a trunk lid 9. The luggage rack cross-bar 12 transitions into anchor post 14 which terminates at end 16 within retainer 40. A cleat generally designated as 20 is swivably mounted to anchor post 14, the top 24 of the cleat serves as a handle 22, while the base 28 has a pair of pins 26 horizontally protruding therefrom. A flange 18 at base 16 of the anchor post 14 serves as a retainer for one end of a spring 32. The other end of the spring 32 slips into a recess 30 adjacent base 28 in cleat 20. The spring serves to urge the pins 26 of the cleat 20 into engagement with a detent 48 in housing 44 of the luggage rack retaining mechanism. A spring-loaded cover plate 52 has a flange 58 at base 56 of the cover plate. Spring 60 urges the top of the cover plate 54 against base 16 of the anchor post 14. Spring 32 is much stronger than spring 60 so as to firmly retain anchor post 14 within housing 44.

Figure 4:
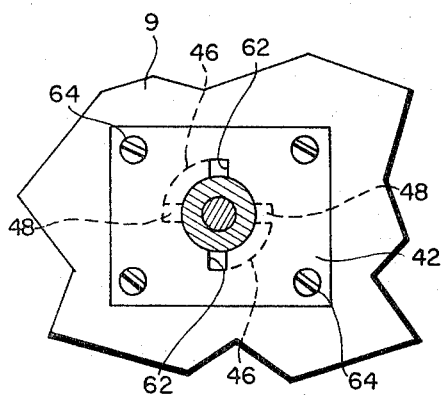
FIG. 4 is a view taken along lines 4—4 of FIG. 3, illustrating the cleats surrounding an anchor post of the luggage rack which is engaged with the luggage rack retaining mechanism.

To engage anchor post 14 of the luggage rack 10 with the retaining mechanism 40, the pins 26 are aligned with vertical slots 62 (FIG. 4) in housing 44. The swivel cleat 20 is depressed until pins 26 align with the slots 46 in housing 44. The cleat is rotated 90° to align pins 26 with detent 48, thus locking the cleat within its retainer. Base 16 of the anchor post 14 is pushed against the top 54 of the cover plate 52, depressing spring 60 into housing 44. Spring 32, between flange 18 of anchor post 14 and the recess 30 of cleat 20, being much stronger than spring 60, assures that pins 26 remain locked into detents 48 in housing 44 regardless of how much weight or pressure the cross bars 12 of luggage rack are subjected to. If it were not for spring 32 urging the pins 26 into their respective detents, then it can be realized that end 16 of anchor post 14 could work the cleat retaining pins 26 loose from the grasp of the detents 48.

The swivelling cleat attached to each anchor post 14 is necessary to engage the luggage rack within a rack retaining mechanism 40. Since the cross-bars 12 have two or more anchor posts 14 attached to each rack, a means had to be provided to engage each of the anchor posts to its retaining mechanism. Obviously, the rack itself could not be rotated 90°, as heretofore described, to engage the posts because two or more posts are an integral part of the rack 10.

Figure 5:
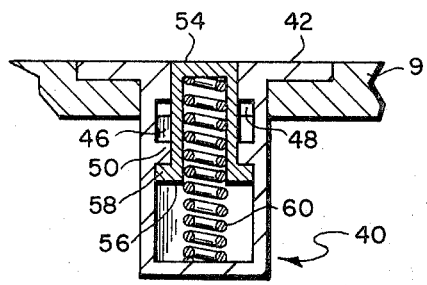
FIG. 5 is a cross-sectional view taken through the luggage rack retaining mechanism with the rack removed therefrom.

FIG. 5 illustrates the luggage rack retaining frame 40 mounted to trunk lid 9 without the luggage rack retained therein. The top 54 of cover plate 52 is flush with mounted flange 42 of housing 44. Flange 58 of cover plate 52 is engaged with shoulder 50 of housing 44, thus preventing the cover plate from ejecting itself from frame 40.

It should again be pointed out that the invention has application in many other areas such as mounting removable aircraft lounges to flight decks, life boats to decks of watercraft, and the like.

I claim:

1. Apparatus to securely retain a removable automobile luggage rack having two or more anchor posts affixed to each one of at least a pair of integral load bearing cross-bar members of said luggage rack, said luggage rack retaining apparatus comprising:

housing frame members for each of said anchor posts connected to an automobile having center openings formed by said housing members to accept and support respective ends of said anchor posts of said load bearing cross-bar members of said luggage rack, cleat retaining means independent from said load bearing cross-bar members having a first end with thumb screw levers extending radially outwardly swivably mounted to the ends of said two or more anchor posts integral with said load bearing cross-bar members, said cleat means having a pair of pins radially extending outwardly from a second end of said cleat means which engage a pair of detent means in said housing frame members when said swivable cleat is rotated 90° about the shaft of said anchor posts within said housing to retain said two or more anchor posts to each one of at least a pair of integral load bearing cross-bar members within said housing frame members, a first spring means between the end of each of said anchor posts and the second end of said swivable cleat means, said first spring means serving to force said radially extending pins in said second end of said cleat means away from the end of said anchor posts against said pair of detent means in said housing to prevent said pair of pins from becoming disengaged from said housing frame members, and a closeout plate member resiliently retained by a second spring means within said housing frame members, said plate member serving to closeout said opening formed by said frame members when said anchor posts affixed to said load bearing cross-bar members of said luggage rack are removed from said frame members, said first spring means being much stronger than said second spring means so as to assure that said second spring means is sufficiently suppressed by the ends of the anchor posts while firmly engaging said radially extending pins against said detent means in said housing.

* * * * *